(12) United States Patent
Kawada et al.

(10) Patent No.: US 12,315,917 B2
(45) Date of Patent: May 27, 2025

(54) POSITIVE ELECTRODE ACTIVE MATERIAL FOR NONAQUEOUS ELECTROLYTE SECONDARY BATTERIES, AND NONAQUEOUS ELECTROLYTE SECONDARY BATTERY

(71) Applicant: Panasonic Intellectual Property Management Co., Ltd., Osaka (JP)

(72) Inventors: Hiroshi Kawada, Hyogo (JP); Mitsuhiro Hibino, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 550 days.

(21) Appl. No.: 17/763,930

(22) PCT Filed: Sep. 29, 2020

(86) PCT No.: PCT/JP2020/036799
§ 371 (c)(1),
(2) Date: Mar. 25, 2022

(87) PCT Pub. No.: WO2021/065859
PCT Pub. Date: Apr. 8, 2021

(65) Prior Publication Data
US 2022/0344644 A1    Oct. 27, 2022

(30) Foreign Application Priority Data
Sep. 30, 2019   (JP) .................................. 2019-179239

(51) Int. Cl.
| H01M 4/36 | (2006.01) |
|---|---|
| H01M 4/505 | (2010.01) |
| H01M 4/525 | (2010.01) |
| H01M 4/02 | (2006.01) |
| H01M 10/0525 | (2010.01) |

(52) U.S. Cl.
CPC ........... *H01M 4/366* (2013.01); *H01M 4/505* (2013.01); *H01M 4/525* (2013.01); *H01M 2004/028* (2013.01); *H01M 10/0525* (2013.01)

(58) Field of Classification Search
CPC ...... H01M 4/366; H01M 4/505; H01M 4/525; H01M 10/0525; H01M 2004/028; H01M 4/131; H01M 4/628; Y02E 60/10
See application file for complete search history.

(56) References Cited

U.S. PATENT DOCUMENTS

| | | |
|---|---|---|
| 2008/0193841 A1 | 8/2008 | Sun et al. |
| 2012/0282521 A1 | 11/2012 | Choi et al. |
| 2013/0183589 A1 | 7/2013 | Minamida et al. |
| 2017/0040594 A1 | 2/2017 | Yamaki et al. |
| 2018/0138511 A1* | 5/2018 | Munaoka ............... H01M 4/483 |
| 2018/0212233 A1 | 7/2018 | Ito et al. |
| 2021/0408547 A1* | 12/2021 | Wang ................. H01M 10/0567 |

FOREIGN PATENT DOCUMENTS

| JP | 11-191416 A | 7/1999 |
|---|---|---|
| JP | 2008-535173 A | 8/2008 |
| JP | 2012-234818 A | 11/2012 |
| JP | 2013-149433 A | 8/2013 |
| JP | 2016-31852 A | 3/2016 |
| JP | 2016-81822 A | 5/2016 |
| JP | 2017-33817 A | 2/2017 |
| JP | 2018-120705 A | 8/2018 |
| WO | 2012/043566 A1 | 4/2012 |

OTHER PUBLICATIONS

Tang Manjing et al: "Overall structural modification of a layered Ni-rich cathode for enhanced cycling stability and rate capability at high voltage", Journal of Materials Chemistry A, vol. 7, No. 11, Mar. 12, 2019 (Mar. 12, 2019), pp. 6080-6089, XP055965350, GB ISSN: 2050-7488, DOI:10.1039/C8TA12494A; Cited in Extended European Search Report dated Oct. 5, 2022.

The Extended European Search Report dated Oct. 5, 2022, issued in counterpart EP Application No. 20871066.5. (10 pages).

Wang et al., "Improved electrochemical cycling performance of high-voltage spinel $LiNi_{0.5}$—$Mn_{1.5}O_4$ cathode materials by coating with spinel $MgAl_2O_4$", Solid State Ionics, Mar. 19, 2019, vol. 336, pp. 19-25, cited in ISR (7 pages).

Wu et al., "Enhanced cyclic stability at elevated temperature of spinel $LiNi_{0.5}Mn_{1.5}O_4$ by $Li_4Ti_5O_{12}$ coating as cathode material for high voltage lithium ion batteries", Ceramics International, Nov. 27, 2018, vol. 45, pp. 5072-5079, cited in ISR (8 pages).

International Search Report dated Dec. 15, 2020, issued in counterpart International Application No. PCT/JP2020/036799 (3 pages).

Jun Sugiyama et al., Lithium diffusion in spinel Li4Ti5O12 and LiTi2O4 films detected with 8Li β-NMR, Physical Review B, Sep. 1, 2017, vol. 96, No. 9, DOI: 10.1103/PhysRevB.96.094402; Cited in JP Office Action dated Jul. 23, 2024. (11 pages).

Office Action dated Jul. 23, 2024, issued in counterpart JP Application No. 2021-551284 with English translation. (17 pages).

* cited by examiner

*Primary Examiner* — Muhammad S Siddiquee
(74) *Attorney, Agent, or Firm* — WHDA, LLP

(57) ABSTRACT

A positive electrode active material for nonaqueous electrolyte secondary batteries according to the present invention comprises: a lithium transition metal composite oxide which has a spinel structure; and a coating layer which is provided on the surface of the lithium transition metal composite oxide, while having a spinel structure, and which contains Li but does not contain Mn.

6 Claims, 1 Drawing Sheet

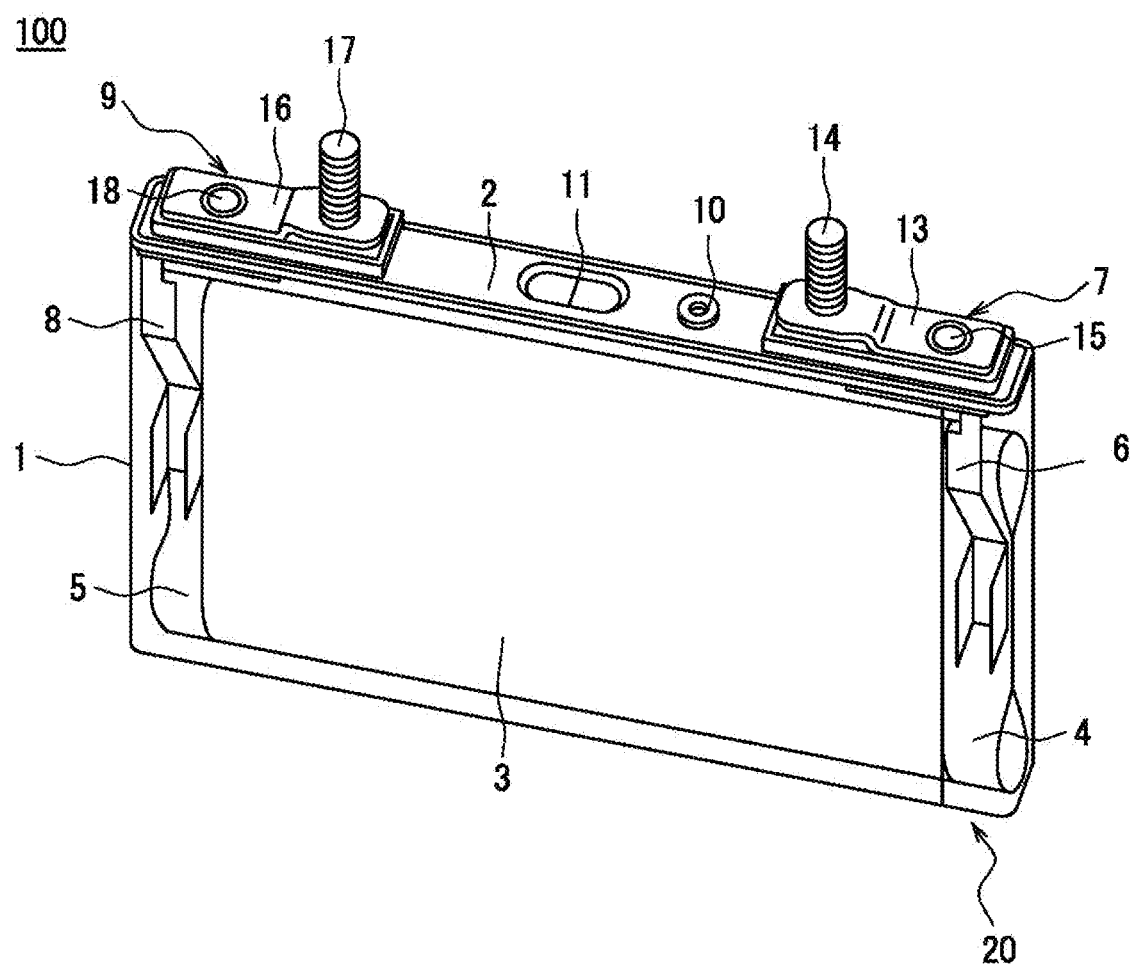

POSITIVE ELECTRODE ACTIVE MATERIAL FOR NONAQUEOUS ELECTROLYTE SECONDARY BATTERIES, AND NONAQUEOUS ELECTROLYTE SECONDARY BATTERY

CROSS-REFERENCE TO RELATED APPLICATION

This application is a National Phase Application filed under 35 U.S.C. § 371 of International Application No. PCT/JP2020/036799 filed on Sep. 29, 2020 which claims the benefit of priorities under 35 U.S.C. § 119 (a) of Japanese Patent Application No. 2019-179239 filed in Japan on Sep. 30, 2019, the contents of which are incorporated herein by reference.

TECHNICAL FIELD

The present disclosure generally relates to a positive electrode active material for a non-aqueous electrolyte secondary battery and to a non-aqueous electrolyte secondary battery using the positive electrode active material.

BACKGROUND ART

A lithium-transition metal composite oxide containing Li, Ni, and Mn, and having a spinel structure has attracted attention as a positive electrode active material because of a high battery potential and rich recoverable reserves of Mn. Patent Literature 1 discloses a positive electrode active material in which a surface of a lithium-manganese oxide is coated with a lithium-free oxide having a spinel structure to prevent deterioration of battery characteristics at high temperature and high voltage. Patent Literature 2 discloses a positive electrode active material having a spinel structure and made of a bilayer-structured lithium-manganese oxide having different compositions on a surface and inside thereof to prevent deterioration of battery characteristics.

CITATION LIST

Patent Literature

PATENT LITERATURE 1: Japanese Unexamined Patent Application Publication No. 2012-234818
PATENT LITERATURE 2: National Publication of International Patent Application No. 2008-535173

SUMMARY

The positive electrode active material disclosed in Patent Literature 1, which has a lithium-free oxide coating, may bring about lowered Li-ion conductivity, resulting in deteriorated battery characteristics such as rate characteristics and a battery capacity. The positive electrode active material disclosed in Patent Literature 2, which contains Mn on the surface thereof, may suffer from elution of Mn, resulting in deteriorated battery characteristics. Meanwhile, the positive electrode active materials disclosed in Patent Literature 1 and Patent Literature 2, which inhibit the deterioration of the positive electrode active material with the coating, have not been investigated from a viewpoint of improvement in the battery characteristics, and still have room for improvement. In recent years, secondary batteries with a high rate have been required, and improvement in rate characteristics has been desired.

A positive electrode active material for a non-aqueous electrolyte secondary battery of an aspect of the present disclosure includes: a lithium-transition metal composite oxide having a spinel structure; and a coating layer provided on a surface of the lithium-transition metal composite oxide, the coating layer containing Li, containing no Mn, and having a spinel structure.

A non-aqueous electrolyte secondary battery of an aspect of the present disclosure comprises: a positive electrode including the positive electrode active material for a non-aqueous electrolyte secondary battery; a negative electrode; and an electrolyte.

According to an aspect of the present disclosure, formation of a predetermined coating layer on the surface of the lithium-transition metal composite oxide may improve the rate characteristics of the secondary battery.

BRIEF DESCRIPTION OF DRAWING

FIG. 1 is a perspective view of a secondary battery of an example of an embodiment, and illustrates an inside structure of a battery case with removing a front side of an exterior housing body.

DESCRIPTION OF EMBODIMENTS

A lithium-transition metal composite oxide containing Li, Ni, and Mn, and having a spinel structure has a high battery potential, but unfortunately, has a problem of elution of $Mn^{2+}$ on the surface due to disproportionation of $Mn^{3+}$, which destabilize the surface structure. Although Patent Literature 1 and Patent Literature 2 disclose the art of preventing the deterioration of battery characteristics with coating the surface of the lithium-manganese oxide, the art has not been investigated from a viewpoint of proactive improvement in the battery characteristics with a coating. Through the investigation, the present inventors have found that a positive electrode active material in which a coating layer containing Li, containing no Mn, and having a spinel structure is provided on a surface of a lithium-transition metal composite oxide containing Li, Ni, and Mn, and having a spinel structure may yield a secondary battery with improved rate characteristics. This is assumed to be because incorporating Li in the coating layer may maintain the Li-ion conductivity and incorporating no Mn in the coating layer may inhibit the destabilization of the spinel structure due to Mn elution. In addition, it has been found that setting a mole fraction of metal elements excluding Li contained in the coating layer based on the total number of moles of metal elements excluding Li contained in the lithium-transition metal composite oxide to 0.1% to 5% may improve the rate characteristics and a cycle maintenance rate, as described later.

Hereinafter, an example of an embodiment of the present disclosure will be described in detail. In the present embodiment, a secondary battery 100 comprising a rectangular metallic exterior housing body 1 will be exemplified, but a shape of the exterior housing body is not limited to be rectangular, and may be, for example, cylindrical or the like. A wound electrode assembly 3 will be exemplified, but may be a stacked electrode assembly in which a plurality of positive electrodes and a plurality of negative electrodes are alternately stacked one by one with separators interposed therebetween. In both of a positive electrode and a negative electrode, a case where each mixture layer is formed on both surfaces of each core body will be exemplified, but each mixture layer is not limited to the case where it is formed on both the surfaces of each core body as long as each mixture layer is formed on at least one surface of each core body.

As exemplified in FIG. 1, the secondary battery 100 comprises: the wound electrode assembly 3 in which the positive electrode and the negative electrode are wound with a separator interposed therebetween, which has a plain part and a pair of curved parts, and which is formed flatly; an electrolyte; and the exterior housing body 1 housing the electrode assembly 3 and the electrolyte. The exterior housing body 1 and a sealing plate 2 are both metallic, and preferably made of aluminum or an aluminum alloy.

The exterior housing body 1 has: a substantially rectangular bottom part viewed from a bottom face; and a side wall part provided in a standing manner on a peripheral edge of the bottom part. The side wall part is formed perpendicularly to the bottom part. A size of the exterior housing body 1 is not particularly limited, and for example, 60 to 160 mm in lateral length, 60 to 100 mm in height, and 10 to 40 mm in thickness.

The positive electrode is an elongated body having a metallic positive electrode core body and a positive electrode mixture layer formed on both surfaces of the core body, and formed is a band-shaped positive electrode core body exposed part 4 where the positive electrode core body is exposed along the longitudinal direction at one end part in the short direction. Similarly, the negative electrode is an elongated body having a metallic negative electrode core body and a negative electrode mixture layer formed on both surfaces of the core body, and formed is a band-shaped negative electrode core body exposed part 5 where the negative electrode core body is exposed along the longitudinal direction at one end part in the short direction. The electrode assembly 3 has a structure in that the positive electrode and the negative electrode are wound with the separator interposed therebetween in a state where the positive electrode core body exposed part 4 of the positive electrode is disposed on one end side in the axial direction and the negative electrode core body exposed part 5 of the negative electrode is disposed on the other side in the axial direction.

A positive electrode current collector 6 is connected to a stacked part of the positive electrode core body exposed part 4 of the positive electrode, and a negative electrode current collector 8 is connected to a stacked part of the negative electrode core body exposed part 5 of the negative electrode. A preferable positive electrode current collector 6 is made of aluminum or an aluminum alloy. A preferable negative electrode current collector 8 is made of copper or a copper alloy. A positive electrode terminal 7 has: a positive electrode external conductor 13 disposed on the sealing plate 2 outside the battery; a positive electrode bolt part 14 connected to the positive electrode external conductor 13; and a positive electrode insertion part 15 inserted through a through hole provided on the sealing plate 2. The positive electrode terminal 7 is electrically connected to the positive electrode current collector 6. A negative electrode terminal 9 has: a negative electrode external conductor 16 disposed on the sealing plate 2 outside the battery; a negative electrode bolt part 17 connected to the negative electrode external conductor 16; and a negative electrode insertion part 18 inserted through a through hole provided on the sealing plate 2. The negative electrode terminal 9 is electrically connected to the negative electrode current collector 8.

The positive electrode terminal 7 is fixed on the sealing plate 2 with an internal insulating member interposed therebetween, and the positive electrode current collector 6 is fixed on the sealing plate 2 with an external insulating member interposed therebetween. The internal insulating member is interposed between the sealing plate 2 and the positive electrode current collector 6, and the external insulating member is interposed between the sealing plate 2 and the positive electrode terminal 7. Similarly, the negative electrode terminal 9 is fixed on the sealing plate 2 with the internal insulating member interposed therebetween and the negative electrode current collector 8 is fixed on the sealing plate 2 with the external insulating member interposed therebetween. The internal insulating member is interposed between the sealing plate 2 and the negative electrode current collector 8, and the external insulating member is interposed between the sealing plate 2 and the negative electrode terminal 9.

The electrode assembly 3 is housed in the exterior housing body 1. The sealing plate 2 is connected to an edge of an opening of the exterior housing body 1 by laser welding or the like. The sealing plate 2 has an electrolyte injecting hole 10, which is to be sealed with a sealing plug after the electrolyte is injected into the exterior housing body 1. On the sealing plate 2, a gas discharging vent 11 is formed for discharging gas if an internal pressure of the battery increases to a predetermined value or more.

The electrolyte is a non-aqueous electrolyte including a non-aqueous solvent and an electrolyte salt dissolved in the non-aqueous solvent. For the non-aqueous solvent, for example, carbonates, lactones, ethers, ketones, esters, and the like may be used, and two or more of these solvents may be mixed to be used. When two or more of the solvents are mixed to be used, a mixed solvent including a cyclic carbonate and a chain carbonate is preferably used. For example, ethylene carbonate (EC), propylene carbonate (PC), butylene carbonate (BC), and the like may be used as the cyclic carbonate, and dimethyl carbonate (DMC), ethyl methyl carbonate (EMC), diethyl carbonate (DEC), and the like may be used as the chain carbonate. The non-aqueous solvent may contain a halogen-substituted solvent in which at least some hydrogens in the solvent are substituted with halogen atoms such as fluorine. For the electrolyte salt, $LiPF_6$, $LiBF_4$, $LiCF_3SO_3$, and the like, and a mixture thereof may be used. An amount of the electrolyte salt dissolved in the non-aqueous solvent may be, for example, 0.5 to 2.0 mol/L. Additives such as vinylene carbonate (VC) may also be appropriately added. The electrolyte is not limited to a liquid electrolyte, and may be a solid electrolyte using a gel polymer or the like.

Hereinafter, the positive electrode, negative electrode, and separator, which constitute the electrode assembly 3, particularly the positive electrode active material constituting the positive electrode, will be described in detail.

[Positive Electrode]

The positive electrode has a positive electrode core body and a positive electrode mixture layer provided on a surface of the positive electrode core body. For the positive electrode core body, a foil of a metal stable within a potential range of the positive electrode, such as aluminum, a film in which such a metal is disposed on a surface layer thereof, and the like may be used. The positive electrode mixture layer includes a positive electrode active material, a binder, and a conductive agent, and is preferably provided on both surfaces of the positive electrode core body except for the positive electrode core body exposed part 4. The positive electrode may be produced by, for example, applying a positive electrode mixture slurry including the positive electrode active material, the binder, the conductive agent, and the like on the surface of the positive electrode core body, drying and subsequently compressing the applied film to form the positive electrode mixture layers on both the surfaces of the positive electrode core body.

Examples of the conductive agent included in the positive electrode mixture layer may include a carbon material such as carbon black, acetylene black, Ketjenblack. and graphite. Examples of the binder included in the positive electrode mixture layer may include a fluororesin such as polytetrafluoroethylene (PTFE) and polyvinylidene fluoride (PVdF), polyacrylonitrile (PAN), a polyimide, an acrylic resin, and a polyolefin. With these resins, a cellulose derivative such as carboxymethyl cellulose (CMC) or a salt thereof, polyethylene oxide (PEO), and the like may be used in combination.

The positive electrode active material includes: a lithium-transition metal composite oxide having a spinel structure; and a coating layer provided on a surface of the lithium-transition metal composite oxide and having a spinel structure. In addition, the coating layer contains Li, and contains no Mn, which improves rate characteristics of the battery. The spinel structure of each of the lithium-transition metal composite oxide and the coating layer may be confirmed by X-ray diffraction (XRD). Hereinafter, for convenience of description, the lithium-transition metal composite oxide having the coating layer is referred to as "composite oxide (Z)". The positive electrode active material is mainly composed of the composite oxide (Z), and may be composed of substantially only the composite oxide (Z). The positive electrode active material may include a composite oxide other than the composite oxide (Z) or another compound within a range in that an object of the present disclosure is not impaired.

The composite oxide (Z) is, for example, a secondary particle formed by aggregation of primary particles. The particle diameter of the primary particles constituting the secondary particle is, for example, 0.05 μm to 1 μm. The particle diameter of the primary particles is measured as a diameter of a circumscribed circle in a particle image observed with a scanning electron microscope (SEM). The coating layer may be present on surfaces of the primary particles inside the secondary particle and on a particle boundary as well as on the surface of the secondary particle of the composite oxide (Z).

The composite oxide (Z) is particles having a median diameter (D50) on a volumetric basis of, for example, 3 μm to 30 μm, preferably 5 μm to 25 μm, and particularly preferably 7 μm to 15 μm. The D50, also referred to as a median diameter, means a particle diameter at which a cumulative frequency is 50% from a smaller particle diameter side in a particle size distribution on a volumetric basis. The particle size distribution of the composite oxide (Z) may be measured by using a laser diffraction-type particle size distribution measuring device (for example, MT3000II, manufactured by MicrotracBEL Corp.) with water as a dispersion medium.

The lithium-transition metal composite oxide forming the composite oxide (Z) may be a composite oxide represented by the general formula $Li_{1+\alpha}Ni_{0.5-x}Mn_{1.5-y}M_{x+y}O_4$ (in the formula, $0 \leq \alpha < 0.2$, $0 \leq x < 0.2$, $0 \leq y < 0.5$, and M represents at least one or more elements selected from the group consisting of Mg, Al, Sc, Ti, Cr, V, Fe, and Co). Mole fractions of each element constituting the lithium-transition metal composite oxide are measured by inductively coupled plasma (ICP) atomic emission spectroscopic analysis.

The coating layer forming the composite oxide (Z) may include at least one or more elements selected from the group consisting of Ti, Ge, V, and Cr. Containing the element allows the coating layer to have the spinel structure.

The coating layer particularly preferably includes at least Ge. A coating layer including Ge has a low melting point, and coating is easily performed.

A lattice constant a of the coating layer may satisfy 8.10 Å<a<8.40 Å. The lithium-transition metal composite oxide has a lattice constant a of near 8.17 Å, and a lattice constant a of the coating layer within the above range yields a good matching between the lithium-transition metal composite oxide and the coating layer to improve stability of the coating layer. The lattice constant a may be calculated from a measurement result of XRD.

In the composite oxide (Z), the lithium-transition metal composite oxide may include a modified layer of a solid solution of the coating layer. The modified layer, which contains Li and Mn, has a different composition from the lithium-transition metal composite oxide excluding the modified layer. In a production of the composite oxide (Z), described later, regulating production conditions such as a calcining temperature may change a presence or absence of the modified layer and a thickness of the modified layer.

A mole fraction of metal elements excluding Li contained in the coating layer based on the total number of moles of metal elements excluding Li contained in the lithium-transition metal composite oxide may be 0.1% to 5%. The mole fraction may improve the rate characteristics and the cycle maintenance rate. The coating layer may be formed for covering an entire surface of the secondary particles, and may be scatteringly present on the particle surface. A present state of the coating layer may be observed by a SEM. A thickness of the coating layer on the surface of the lithium-transition metal composite oxide may be 1 μm or smaller.

The composite oxide (Z) may be produced by, for example, the following procedure.

(1) A Li source such as lithium hydroxide (LiOH) is added into a composite compound (X) containing no Li, and the mixtures is calcined to synthesize a lithium composite oxide (Y). An example of the composite compound is a composite oxide or hydroxide containing Ni and Mn.

(2) A Li source such as LiOH and a compound including at least one or more elements selected from the group consisting of Ti, Ge, V, and Cr are added into the composite oxide (Y) to form a composite of a coating layer precursor, which contains Li and contains no Mn, on a surface of the composite oxide (Y), and then the composite is calcined to synthesize the composite oxide (Z).

A calcining temperature in the step (2) is, for example, 200° C. to 1050° C. Regulating the calcining temperature may regulate a surface covering state of the coating layer and a thickness of the coating layer in the lithium-transition metal composite oxide.

[Negative Electrode]

The negative electrode has a negative electrode core body and a negative electrode mixture layer provided on a surface of the negative electrode core body. For the negative electrode core body, a foil of a metal stable within a potential range of the negative electrode, such as copper, a film in which such a metal is disposed on a surface layer thereof, and the like may be used. The negative electrode mixture layer includes a negative electrode active material and a binder, and is preferably provided on both surfaces of the negative electrode core body except for the negative electrode core body exposed part 5. The negative electrode may be produced by, for example, applying a negative electrode mixture slurry including the negative electrode active material, the binder, and the like on the surface of the negative electrode core body, drying and subsequently compressing the applied film to form the negative electrode mixture layers on both the surfaces of the negative electrode core body.

The negative electrode mixture layer includes, for example, a carbon-based active material to reversibly occlude and release lithium ions, as the negative electrode active material. The carbon-based active material is preferably a graphite such as: a natural graphite such as flake graphite, massive graphite, and amorphous graphite; and an artificial graphite such as massive artificial graphite (MAG) and graphitized mesophase-carbon microbead (MCMB). For the negative electrode active material, a Si-based active material composed of at least one of Si and a Si-containing compound may also be used, and the carbon-based active material and the Si-based active material may be used in combination.

For the binder included in the negative electrode mixture layer, a fluororesin. PAN, a polyimide, an acrylic resin, a polyolefin, and the like may be used similar to that in the positive electrode, but styrene-butadiene rubber (SBR) is preferably used. The negative electrode mixture layer preferably further includes CMC or a salt thereof, polyacrylic acid (PAA) or a salt thereof, polyvinyl alcohol (PVA), and the like. Among them, SBR; and CMC or a salt thereof, or PAA or a salt thereof are preferably used in combination.

[Separator]

For the separator, a porous sheet having an ion permeation property and an insulation property is used. Specific examples of the porous sheet include a fine porous thin film, a woven fabric, and a nonwoven fabric. As a material for the separator, a polyolefin such as polyethylene and polypropylene, cellulose, and the like are preferable. The separator may have any of a single-layered structure and a multilayered structure. On a surface of the separator, a heat-resistant layer and the like may be formed.

EXAMPLES

Hereinafter, the present disclosure will be further described with Examples, but the present disclosure is not limited to these Examples.

Example 1

[Synthesis of Positive Electrode Active Material]

A nickel-manganese composite hydroxide having D50 of 12 μm with a composition of $Ni_{0.5}Mn_{1.5}(OH)_4$, obtained by coprecipitation, was calcined at 500° C. to obtain a nickel-manganese composite oxide (X).

Then, LiOH and the nickel-manganese composite oxide (X) were mixed so that a molar ratio between Li and the total amount of Ni and Mn was 1:2. This mixture was calcined at 900° C. for 10 hours, and then crushed to obtain a lithium composite oxide (Y). XRD demonstrated that the lithium composite oxide (Y) had a spinel structure. ICP analysis demonstrated that the lithium composite oxide (Y) had a composition of $LiNi_{0.5}Mn_{1.5}O_4$.

A coating material (A), which is a material for the coating layer, was prepared. LiOH, $Ni(OH)_2$, and $GeO_2$ were mixed so that a molar ratio of Li, Ni, and Ge was 2:1:3. This mixture was calcined at 900° C. for 10 hours, and then crushed to obtain a lithium-germanium composite oxide (A), which is the coating material. XRD demonstrated that the coating material (A) had a spinel structure. A lattice constant a of the coating material (A) was 8.180 Å.

Next, this coating material (A) was crushed with a ball mill at 300 rpm for 10 hours, followed by dry-mixing so that a molar ratio between the total amount of Ni and Mn in the lithium composite oxide (Y) and the total amount of Ni and Ge in the coating material (A) was 1:0.01. This mixture was heat-treated in the atmosphere at 1020° C. for 30 minutes, and then crushed to obtain a positive electrode active material in which a surface of the lithium composite oxide (Y) was coated with $LiNi_{0.5}Ge_{1.5}O_4$ as the coating layer.

[Production of Positive Electrode]

The above positive electrode active material, acetylene black, and polyvinylidene fluoride (PVdF) were mixed at a solid-content mass ratio of 96.3:2.5:1.2, an appropriate amount of N-methyl-2-pyrrolidone (NMP) was added, and then the mixture was kneaded to prepare a positive electrode mixture slurry. This positive electrode mixture slurry was applied on both surfaces of a positive electrode core body made of aluminum foil, the applied film was dried, and then rolled using a roller and cut to a predetermined electrode size to obtain a positive electrode in which the positive electrode mixture layer was formed on both the surfaces of the positive electrode core body. An exposed part where a surface of the positive electrode core body was exposed was provided at a part of the positive electrode.

[Production of Negative Electrode]

Natural graphite was used as the negative electrode active material. The negative electrode active material, carboxymethyl cellulose sodium salt (CMC-Na), and styrene-butadiene rubber (SBR) were mixed at a solid-content mass ratio of 100:1:1 in an aqueous solution to prepare a negative electrode mixture slurry. This negative electrode mixture slurry was applied on both surfaces of a negative electrode core body made of copper foil, the applied film was dried, and then rolled using a roller and cut to a predetermined electrode size to obtain a negative electrode in which the negative electrode mixture layer was formed on both the surfaces of the negative electrode core body. An exposed part where a surface of the negative electrode core body was exposed was provided at a part of the negative electrode.

[Preparation of Non-Aqueous Electrolyte]

Into a mixed solvent of fluoroethylene carbonate (FEC) and methyl 3,3,3-trifluoropropionate (FMP) at a volume ratio of 2:8, lithium hexafluorophosphate ($LiPF_6$) was dissolved at a concentration of 1.0 mol/litter. Vinylene carbonate (VC) was further dissolved into the above mixed solvent at a concentration of 2.0 mass % to prepare a non-aqueous electrolyte.

[Production of Battery]

An aluminum lead was attached to the exposed part of the positive electrode, a nickel lead was attached to the exposed part of the negative electrode, the positive electrode and the negative electrode were spirally wound with a separator made of polyolefin interposed therebetween, and then press-formed in the radial direction to produce a flat, wound electrode assembly. This electrode assembly was housed in an exterior housing body composed of an aluminum laminated sheet, the above non-aqueous electrolyte was injected thereinto, and then an opening of the exterior housing body was sealed to obtain a non-aqueous electrolyte secondary battery having a designed capacity of 650 mAh.

Example 2

A non-aqueous electrolyte secondary battery was produced in the same manner as in Example 1 except that LiOH, $Co_3O_4$, and $GeO_2$ were mixed so that a molar ratio of Li, Co, and Ge was 2:1:3 in the preparation of the coating material (A). XRD demonstrated that the coating layer had a spinel structure. A lattice constant a of the coating layer was 8.196.

Example 3

A non-aqueous electrolyte secondary battery was produced in the same manner as in Example 1 except that LiOH, ZnO, and $GeO_2$ were mixed so that a molar ratio of Li, Zn, and Ge was 2:1:3 in the preparation of the coating material (A). XRD demonstrated that the coating layer had a spinel structure. A lattice constant a of the coating layer was 8.210.

Example 4

A non-aqueous electrolyte secondary battery was produced in the same manner as in Example 1 except that LiOH, $Co_3O_4$, and $GeO_2$ were mixed so that a molar ratio of Li. Co, and Ge was 2:1:3, followed by dry-mixing so that a molar ratio between the total amount of Ni and Mn in the lithium composite oxide (Y) and the total amount of Co and Ge in the coating material (A) was 1:0.10, in the preparation of the coating material (A). XRD demonstrated that the coating layer had a spinel structure. A lattice constant a of the coating layer was 8.196.

Comparative Example 1

A non-aqueous electrolyte secondary battery was produced in the same manner as in Example 1 except that coating with the coating layer was not performed and the lithium composite oxide (Y) itself was used as the positive electrode active material.

Comparative Example 2

A non-aqueous electrolyte secondary battery was produced in the same manner as in Example 1 except that: the lithium composite oxide (Y) and $Co_3O_4$ were dry-mixed so that a molar ratio between the total amount of Ni and Mn in the lithium composite oxide (Y) and Co in $Co_3(OH)_4$ was 1:0.025 to obtain a positive electrode active material in which a surface of the lithium composite oxide (Y) was coated with $Co_3O_4$ as the coating layer. XRD demonstrated that the coating layer had a spinel structure. A lattice constant a of the coating layer was 8.084.

Rate characteristics and a capacity maintenance rate after a cycle test were evaluated on each of the batteries of Examples and Comparative Examples. The evaluation results are shown in Table 1. Table 1 also shows: compositions of the coating layers; and mole fractions of metal elements excluding Li contained in the coating layer based on the total number of moles of metal elements excluding Li contained in the lithium-transition metal composite oxide (described as "Mole Fraction of Coating Layer" in Table 1).

[Evaluation of Rate Characteristics]

Each of the batteries of Examples and Comparative Examples was charged at a constant current of 0.5 It until a battery voltage reached 4.9 V under a temperature environment of 25° C., and charged at a constant voltage of 4.9 V until a current value reached 0.02 It. Then, the battery was left for 15 minutes. Thereafter, the battery was discharged at a constant current of 0.05 It until a battery voltage reached 3.0 V to measure a discharge capacity C1 at 0.05 It. Next, the battery was charged at a constant voltage of 4.9 V until a current value reached 0.02 It, and then the battery was left for 15 minutes. Thereafter, the battery was discharged at a constant current of 0.2 It until a battery voltage reached 3.0 V to measure a discharge capacity C2 at 0.2 It. The rate characteristics were calculated with the following formula.

Rate characteristics (%)=C2/C1×100

[Evaluation of Capacity Maintenance Rate after Cycle Test]

The following cycle test was performed on each of the batteries of Examples and Comparative Examples. A discharge capacity at the 1st cycle and a discharge capacity at the 10th cycle in the cycle test were determined, and the capacity maintenance rate was calculated with the following formula.

Capacity Maintenance Rate (%)=(Discharge Capacity at 10th Cycle/Discharge Capacity at 1st Cycle)×100

<Cycle Test>

A test cell was charged at a constant current of 0.5 It until a battery voltage reached 4.9 V under a temperature environment of 25° C., and charged at a constant voltage of 4.9 V until a current value reached 0.02 It. Then, the test cell was discharged at a constant current of 1 It until the battery voltage reached 3.0 V. This charge-discharge cycle was repeated 10 times.

TABLE 1

|  | Composition of coating layer | Mole fraction of coating layer | Rate characteristics (%) | Capacity maintenance rate after cycle test (%) |
| --- | --- | --- | --- | --- |
| Example 1 | $LiNi_{0.5}Ge_{1.5}O_4$ | 1% | 99.5 | 99.4 |
| Example 2 | $LiCo_{0.5}Ge_{1.5}O_4$ | 1% | 99.5 | 99.2 |
| Example 3 | $LiZn_{0.5}Ge_{1.5}O_4$ | 1% | 99.5 | 99.1 |
| Example 4 | $LiCo_{0.5}Ge_{1.5}O_4$ | 10% | 99.3 | 98.9 |
| Comparative Example 1 | — | — | 99.1 | 99.0 |
| Comparative Example 2 | $CO_3O_4$ | 2.5% | 99 0 | 99.5 |

As shown in Table 1, any of the batteries of Examples had higher rate characteristics than the batteries of Comparative Examples. Specifically. Examples 1 to 3, in which the mole fraction of metal elements excluding Li contained in the coating layer based on the total number of moles of metal elements excluding Li contained in the lithium-transition metal composite oxide was 1%, had improved rate characteristics and cycle maintenance rate as compared with Comparative Example 1, which had no coating layer.

REFERENCE SIGNS LIST

1 Exterior housing body
2 Sealing plate
3 Electrode assembly
4 Positive electrode core body exposed part
5 Negative electrode core body exposed part
6 Positive electrode current collector
7 Positive electrode terminal
8 Negative electrode current collector
9 Negative electrode terminal
10 Electrolyte injecting hole
11 Gas discharging vent
13 Positive electrode external conductor
14 Positive electrode bolt part
15 Positive electrode insertion part
16 Negative electrode external conductor
17 Negative electrode bolt part
18 Negative electrode insertion part
100 Secondary battery

The invention claimed is:

1. A positive electrode active material for a non-aqueous electrolyte secondary battery, the positive electrode active material including:
   a lithium-transition metal composite oxide having a spinel structure; and
   a coating layer provided on a surface of the lithium-transition metal composite oxide, the coating layer containing Li, containing no Mn, and having a spinel structure,
   wherein the coating layer contains at least one selected from the group consisting of $LiNi_{0.5}Ge_{1.5}O_4$, $LiCo_{0.5}Ge_{1.5}O_4$, and $LiZn_{0.5}Ge_{1.5}O_4$.

2. The positive electrode active material for a non-aqueous electrolyte secondary battery according to claim 1, wherein the lithium-transition metal composite oxide is represented by the general formula $Li_{1+\alpha}Ni_{0.5-x}Mn_{1.5-y}M_{x+y}O_4$, wherein $0 \leq \alpha \leq 0.2$, $0 \leq x < 0.2$, $0 \leq y < 0.5$, and M represents at least one or more elements selected from the group consisting of Mg, Al, Sc, Ti, Cr, V, Fe, and Co.

3. The positive electrode active material for a non-aqueous electrolyte secondary battery according to claim 1, wherein a lattice constant a of the coating layer satisfies 8.10 Å<a<8.40 Å.

4. The positive electrode active material for a non-aqueous electrolyte secondary battery according to claim 1, wherein the lithium-transition metal composite oxide includes a modified layer of a solid solution of the coating layer.

5. The positive electrode active material for a non-aqueous electrolyte secondary battery according to claim 1, wherein a mole fraction of metal elements excluding Li contained in the coating layer based on a total number of moles of metal elements excluding Li contained in the lithium-transition metal composite oxide is 0.1% to 5%.

6. A non-aqueous electrolyte secondary battery, comprising:
   a positive electrode including the positive electrode active material for a non-aqueous electrolyte secondary battery according to claim 1;
   a negative electrode; and
   an electrolyte.

* * * * *